(12) United States Patent
Mietschnig

(10) Patent No.: US 7,320,377 B2
(45) Date of Patent: Jan. 22, 2008

(54) MOBILE CONVEYING VEHICLE

(75) Inventor: Walter Mietschnig, Brand (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 294 days.

(21) Appl. No.: 11/108,068

(22) Filed: Apr. 15, 2005

(65) Prior Publication Data

US 2005/0230190 A1 Oct. 20, 2005

(30) Foreign Application Priority Data

Apr. 16, 2004 (DE) .................. 10 2004 018 646

(51) Int. Cl.
*B62D 33/077* (2006.01)
(52) U.S. Cl. .................. 180/89.12; 296/193.03; 296/193.07; 296/190.07; 280/788
(58) Field of Classification Search ............ 280/89.12, 280/788, 790; 296/190.01, 190.07, 193.03, 296/193.07, 204; 180/89.12
See application file for complete search history.

(56) References Cited

U.S. PATENT DOCUMENTS

| 2,110,753 | A | * | 3/1938 | Zeilman ................. 212/299 |
| 3,836,025 | A | * | 9/1974 | Olson et al. ............ 414/547 |
| 3,917,016 | A | | 11/1975 | Stoufflet |
| 4,161,992 | A | | 7/1979 | Abels |
| 4,235,470 | A | * | 11/1980 | Kauss et al. .......... 296/190.07 |
| 4,265,328 | A | * | 5/1981 | Rowa et al. ............ 180/89.13 |
| 4,275,918 | A | * | 6/1981 | Franco ................ 296/190.07 |
| 4,438,825 | A | * | 3/1984 | Stephens ............... 180/89.12 |
| 4,573,592 | A | * | 3/1986 | Oliphant ................. 212/294 |
| 4,658,970 | A | * | 4/1987 | Oliphant ................. 212/294 |
| 4,674,638 | A | * | 6/1987 | Oliphant ................. 212/294 |
| 5,520,259 | A | * | 5/1996 | Onohara et al. ........ 180/89.12 |
| 5,555,501 | A | * | 9/1996 | Furihata et al. ............. 701/37 |
| 5,603,387 | A | * | 2/1997 | Beard et al. ............ 180/89.12 |
| 5,725,066 | A | * | 3/1998 | Beard et al. ............ 180/89.12 |
| 6,340,201 | B1 | * | 1/2002 | Higuchi .................. 296/190.07 |
| 6,367,390 | B1 | * | 4/2002 | Okubo et al. ............ 105/163.1 |
| 6,478,102 | B1 | * | 11/2002 | Puterbaugh et al. ..... 180/89.12 |
| 6,742,619 | B2 | * | 6/2004 | Farbotnik et al. ............ 180/312 |

FOREIGN PATENT DOCUMENTS

| DE | 1149254 | | 5/1963 |
| DE | 1530734 | | 6/1969 |
| DE | 10224065 | | 12/2003 |
| EP | 426510 A1 | * | 5/1991 |
| EP | 0 833 012 A | | 4/1998 |
| FR | 1 558 324 A | | 2/1969 |
| GB | 2 291 384 A | | 1/1996 |
| GB | 847 555 A | | 9/1998 |
| JP | 01240378 A | * | 9/1989 |

* cited by examiner

Primary Examiner—Eric Culbreth
Assistant Examiner—Timothy D. Wilhelm
(74) Attorney, Agent, or Firm—Alleman Hall McCoy Russell & Tuttle LLP

(57) ABSTRACT

The present application relates to a mobile conveying vehicle comprising axles rigidly arranged on a support frame, an operator's cabin and a series of units and additional unit parts such as an engine, pumps, a radiator, hydraulic tank and/or fuel tank. In accordance with the application, the operator's cabin and the units with additional unit parts are mounted on a common frame construction. The frame construction is uncoupled from the support frame.

15 Claims, 1 Drawing Sheet

MOBILE CONVEYING VEHICLE

CROSS-REFERENCE TO RELATED APPLICATION

This application claims priority to German Application Serial No. 102004018646.4 filed Apr. 16, 2004, the entire disclosure of which is hereby incorporated by reference into the present application, as provided in MPEP §201.13.

FIELD

The present application relates to mobile conveying vehicles.

BACKGROUND AND SUMMARY

Such mobile conveying vehicles are, for example, telescopic loaders such as in particular reach stackers. Reach stackers are vehicles with rubber tires, fitted with a diesel engine and an operator's cabin, similar to a retracted mobile crane. They can transport and stack containers. Such reach stackers are fitted with a container spreader fixedly connected to the telescopic arm. With the known reach stacker, the operator's cabins are arranged on the vehicle connected fixedly or movably to the frame at the rear part. The engine and the associated units are suspended in a support frame.

Mobile vehicles such as the aforesaid reach stackers as a rule have high vibrations in the chassis or in the operator's cabin. A rigid axle connection to the support frame is unavoidable due to the high axle loads which are caused by the load to be taken up by the mobile conveying vehicle. The only spring and damping elements are basically the tires, in the case of the reach stacker the rubber tires. Oscillations and vibrations which are transmitted to the cabin are triggered by road irregularities and also by excitations by the work equipment or the load. The driving comfort can be considerably impaired thereby. Attempts have admittedly been made to arrange the cabin resiliently on the support frame. Despite this resilient support, the vibrations are transmitted to the cabin so that the driving comfort is hardly noticeably improved.

It is the object of the present application to further develop generic mobile conveying vehicles such that the vibrations transmitted to the operator's cabin are noticeably reduced so that the driving comfort is substantially improved.

In accordance with the one example solution, a mobile conveying vehicle comprising axles rigidly arranged on a support frame, an operator's cabin and a series of units and additional unit parts (such as an engine, pumps, radiator, hydraulic and/or fuel tank) is further developed such that the operator's cabin and the units with additional unit parts are mounted on a common frame construction and/or such that the frame construction is uncoupled from the support frame with which it is connected, for example, it is connected thereto via resilient elements.

It is achieved by this construction method that the total weight of the vibrating masses does not only relate—as usual—to the cabin, but also additionally to all units and additional unit parts. The natural frequency is hereby lowered, and the vibrations and excitations in the range of the seat's natural frequencies are damped. The noise level is moreover reduced and the drive comfort thus increased.

In one embodiment, the frame construction is advantageously uncoupled from the support frame via vibration elements and/or damping elements.

Further, the units and additional unit parts may themselves be arranged in a resiliently uncoupled manner on the frame structure. The transmission of the self-induced vibration of the unit, for example of the diesel engine or of the pumps, to the frame structure is thereby minimized.

In accordance with a further aspect, the vehicle cabin can itself again be arranged on the frame structure in a resiliently uncoupled manner.

The axles can also be mounted rigidly, but rigidly floating on the support frame.

In one embodiment, the mobile conveying vehicle is advantageously designed as a telescopic loader, preferably as a reach stacker, with a telescopic boom pivotably arranged on the support frame and having a load receiving means.

DESCRIPTION OF THE DRAWINGS

Further features, details and advantages will be explained with reference to an embodiment shown in the drawing. There are shown.

DETAILED DESCRIPTION

Figure 1:
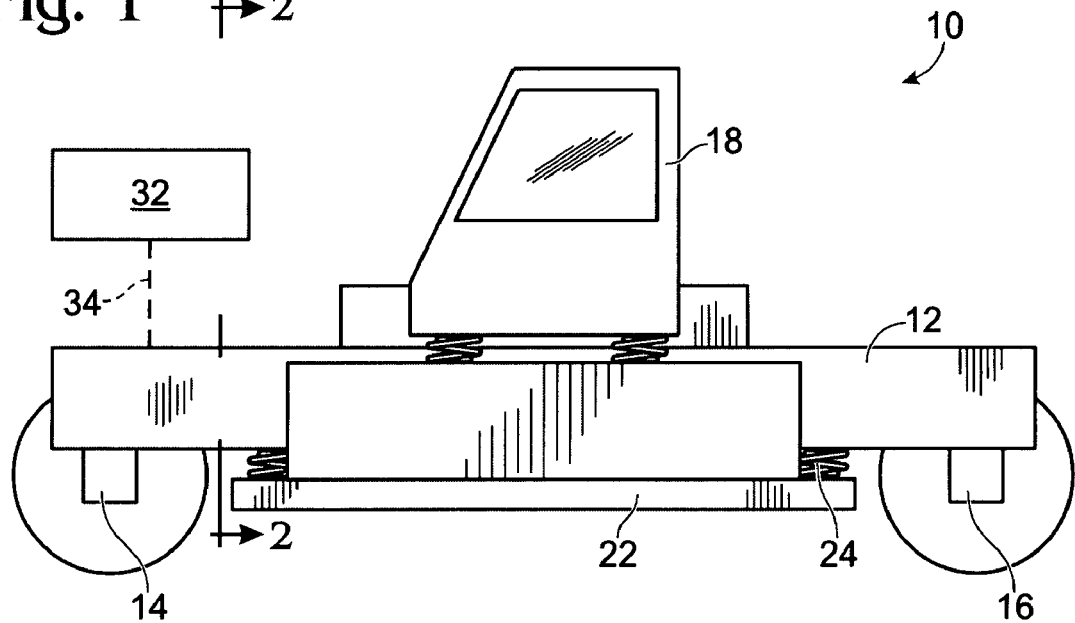
FIG. 1 is a schematic basic side view of a mobile conveying vehicle.

A mobile conveying vehicle 10 is shown schematically in the Figures which can, for example, be a reach stacker. The mobile conveying vehicle 10 has a telescopic boom (with a load receiving means) 32 pivotably arranged at 34 on the support frame 12. For reasons of simplicity, a detailed representation of the telescopic boom with the load receiving means and the other individual parts of the reach stacker have been omitted here. The mobile conveying vehicle 10 first has a central support frame 12 on which the wheel axles 14 and 16 are installed rigidly floating or non-floating. The telescopic boom with the load receiving means not shown in any more detail here is also arranged on the support frame 12.

In accordance with one embodiment, further parts of the mobile conveying vehicle 10, namely an operator's cabin 18 and units with additional unit parts 20, which are only shown schematically as a whole here, are arranged on a frame construction 22.

The frame construction 22 is elastically uncoupled from the central support frame 12 via spring/damping elements 24.

Figure 2:
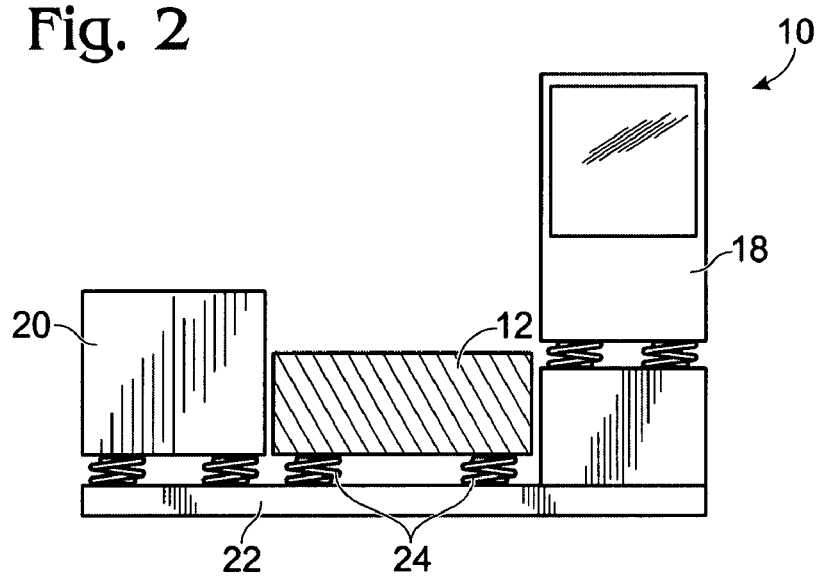
FIG. 2 is a section along the section line—2-2 of FIG. 1.

It can be recognized in accordance with FIG. 2 that the support frame 12 is arranged at the middle and centrally, whereas the frame construction has the operator's cabin 18 on one side and the unit parts and additional unit parts 20 on the other side. The diesel engine, pumps, radiator, hydraulic tanks and the diesel tank belong to the unit parts or additional unit parts, for example.

By the arrangement of the operator's cabin 18 and the unit or the additional unit parts 20 on the frame construction 24, the mass resiliently connected to the support frame 12 is increased, whereby the natural vibration frequency is substantially reduced and corresponding vibrations and excitations in the range of the seat's natural frequency are reduced. The driving comfort for the operator of the mobile conveying vehicle is thereby substantially improved. Moreover, the comparatively high vibrations which are responsible for noise emissions are damped. This results in a reduction of the noise level on the operation of the mobile conveying vehicle.

In the embodiment shown, both the operator's cabin 18, on the one hand, and the units and additional unit parts 20 themselves are again arranged resiliently on the frame construction via vibration elements. A transmission of the vibrations of the diesel engine or of the pumps, for example, to the frame construction is thereby effectively prevented or reduced. Corresponding vibrations from the operator's cabin are also not directly transmitted to the frame construction and vice versa. An optimum vibration damping can be achieved by the corresponding selection of the spring/damping properties of the vibration elements.

The invention claimed is:

1. A mobile conveying vehicle comprising axles rigidly arranged on a support frame, a telescopic boom pivotably arranged on the support frame, an operator's cabin and a series of units and additional unit parts, where the operator's cabin and the units with the additional unit parts are mounted on a common frame construction, where the common frame construction is uncoupled from the support frame and where the common frame construction is mounted below the support frame.

2. A mobile conveying vehicle in accordance with claim 1, wherein the frame construction is uncoupled from the support frame via vibration elements or damping elements.

3. A mobile conveying vehicle in accordance with claim 1, wherein the units and the additional unit parts are arranged on the frame structure in a resiliently uncoupled manner.

4. A mobile conveying vehicle in accordance with claim 1, wherein the operator's cabin is arranged on the frame structure in a resiliently uncoupled manner.

5. A mobile conveying vehicle in accordance with claim 1, wherein the axles are installed on the support frame in a rigidly floating manner.

6. A mobile conveying vehicle in accordance with claim 1, wherein the vehicle is made as a telescopic loader, and where the telescopic boom is pivotably arranged on the support frame with a load receiving means.

7. A mobile conveying vehicle in accordance with claim 6 where the vehicle is a reach stacker.

8. A mobile conveying vehicle in accordance with claim 1 wherein the additional unit parts include at least one of an engine, pumps, a radiator, a hydraulic tank, and a fuel tank.

9. A mobile conveying vehicle operating as a reach stacker, comprising: axles rigidly arranged on a support frame, a telescopic boom pivotably arranged on the support frame, an operator's cabin and a series of units and additional unit parts including an engine, pumps, a radiator, a hydraulic tank, and a fuel tank, where the operator's cabin and the units with the additional unit parts are mounted on a common frame construction, where the frame construction is uncoupled from the support frame and where the common frame construction is mounted below the support frame.

10. A mobile conveying vehicle in accordance with claim 9, wherein the frame construction is uncoupled from the support frame via vibration elements or damping elements.

11. A mobile conveying vehicle in accordance with claim 10, wherein the units and the additional unit parts are arranged on the frame structure in a resiliently uncoupled manner.

12. A mobile conveying vehicle in accordance with claim 11, wherein the operator's cabin is arranged on the frame structure in a resiliently uncoupled manner.

13. A mobile conveying vehicle in accordance with claim 12, wherein the axles are installed on the support frame in a rigidly floating manner.

14. A mobile conveying vehicle in accordance with claim 13, wherein the vehicle is made as a telescopic loader comprising a telescopic boom pivotably arranged on the support frame with a load receiving means.

15. A mobile conveying telescopic loader vehicle operating as a reach stacker, comprising:
- axles rigidly arranged on a support frame, wherein the axles are installed on the support frame in a rigidly floating manner,
- a telescopic boom pivotably arranged on the support frame, the boom having a load receiving means;
- an operator's cabin; and
- a series of units and additional unit parts including a diesel engine, pumps, a radiator, a hydraulic tank, and a fuel tank, where the operator's cabin and the units with the additional unit parts are mounted on a common frame construction in a resiliently uncoupled manner, and wherein the frame construction is uncoupled from the support frame via vibration elements or damping elements and where the common frame construction is mounted below the support frame, and where the units and additional parts are mounted above the support frame, with the operator's cabin positioned offset from and to a side of the support frame and the units and the additional parts positioned offset and to an opposite side of the support frame from the operator's cabin, where the support frame is positioned between the operator's cabin and the units and additional parts.

* * * * *